Nov. 8, 1927.
C. E. STEVENS
1,648,627
STEADYING DEVICE FOR VEHICLE WHEELS
Filed Jan. 4, 1927
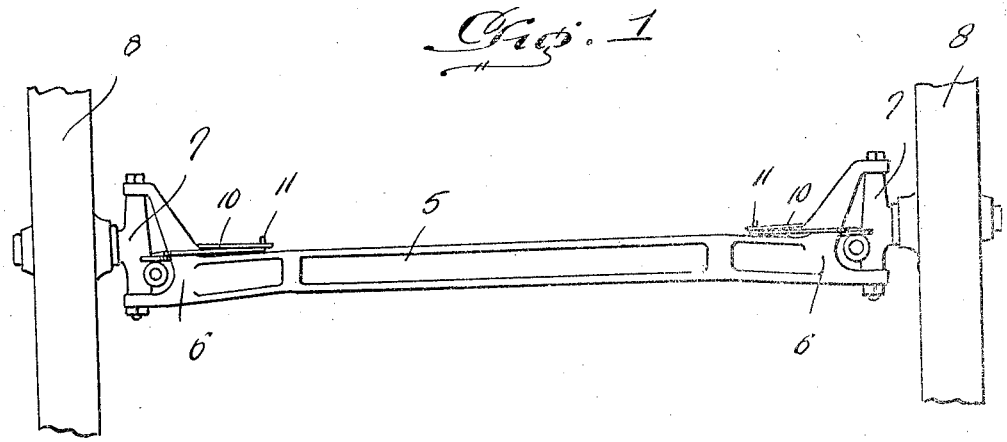
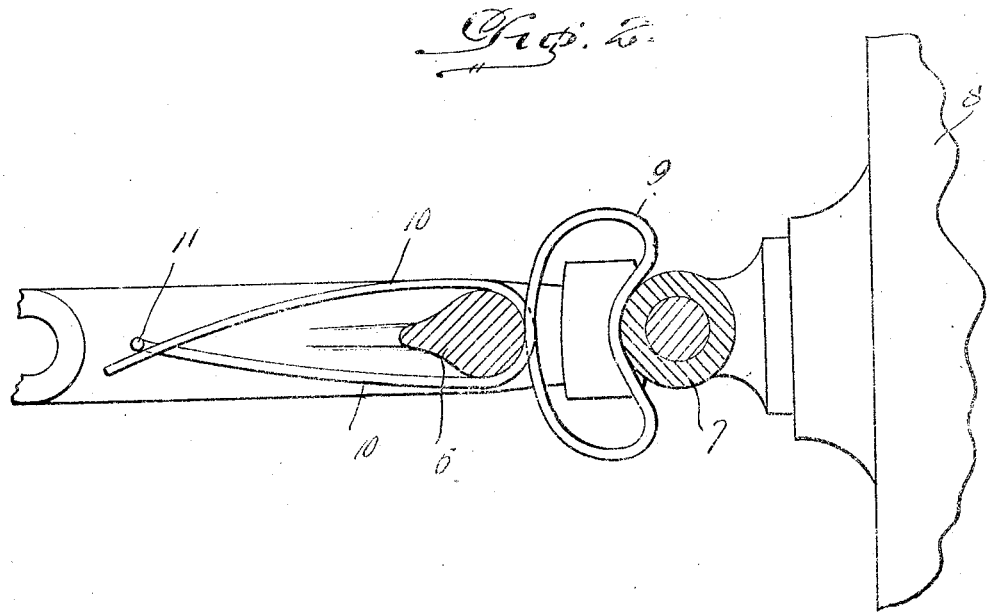
Inventor
C. E. Stevens,
By Clarence A. O'Brien
Attorney Patented Nov. 8, 1927.

1,648,627

UNITED STATES PATENT OFFICE.

CLARENCE E. STEVENS, OF KINGSTON, PENNSYLVANIA.

STEADYING DEVICE FOR VEHICLE WHEELS.

Application filed January 4, 1927. Serial No. 158,925.

This invention relates to means for preventing the wobbling or shimmying of the front wheels of motor vehicles, and has for its primary object the provision of a device that consists of a single element so constructed as to permit of the rapid association with or detachment from the automobile axle.

A further and important object is to provide such a device that is constructed at one end for frictional disposition between the end of the axle and the adjacent spindle arm knuckle to maintain the knuckle against movement upon its pin unless by force, but yet to permit the turning of the knuckle under the action of the steering wheel.

An additional object is to provide a device of this character that is so constructed as to remain permanently associated with the axle and the spindle knuckle when once installed and that will perform its duty as long as applied.

With the foregoing and other objects in view as the nature of the invention will be better understood, the same comprises the novel form, combination and arrangement of parts hereinafter more fully described, shown in the accompanying drawing and claimed.

In the drawing wherein like numerals of reference indicate corresponding parts throughout both of the views:

Figure 1 is a front elevation of an automobile front axle equipped at its ends with a pair of wheels which axle is also equipped at its ends with a pair of steadying devices constructed in accordance with the present invention.

Figure 2 is an enlarged fragmentary section through one end of the axle for disclosing one of the devices in top plan.

Now having particular reference to the drawing, 5 designates a conventional front axle of an automobile forked at its opposite ends. As well known, there is disposed for rotation between the forked ends of the axle spindle knuckles 7—7 upon the arms of which are the front steering wheels 8—8.

My invention consists of a single length of heavy steel wire so bent upon itself and intermediate its ends as to provide a relatively ear shaped loop 9, and a pair of elongated pins 10—10, the ends of which are bent inwardly toward each other, but which ends are normally in slight spaced relation.

One of the pins 10 is of slightly greater length than the other pin, while the end of the other pin is bent directly upwardly for providing a vertical lug 11 in back of which the other pin is to be forced when the device is applied for preventing the accidental disengagement of the same with respect to the axle and the adjacent spindle knuckle.

In actual use the elongated pins 10—10 of the device are disposed upon opposite sides of the upper finger of the fork 6 at the end of the axle after which the ear 9 is forcibly moved into position between the said finger of the fork and the adjacent spindle knuckle 7. At this point it may be well to state that when the pins 10—10 are in unhooked relation, the ear loop 9 is of an area to permit of the easy forced disposition of the same in a horizontal position between the knuckle and said finger as disclosed in Figure 2. However, when the ends of the pins 10—10 are moved into interlocking engagement, the ear-shaped loop 9 is somewhat expanded in a transverse direction so that the same will frictionally bind against the knuckle 7 and the finger of the fork 6 and this intermediate the ends thereof.

At the points of mergence between the pins 10—10 and the ear-shaped loop 9, the wire forming the device is of rounded formation so as to snugly fit the rounded inner surface of the finger of the axle fork 6, as clearly disclosed in Figure 2.

Obviously, a pair of these devices are to be associated with the axle 5 at the opposite ends thereof as disclosed in Figure 1.

It will thus be seen that I have provided a highly novel, simple and efficient device for steadying the front wheels of automobiles that is well adapted for all the purposes heretofore designated, even though I have herein shown and described the invention as consisting of certain detail formation, it is nevertheless to be understood that some changes may be made therein without effecting the spirit and scope of the appended claims.

Having thus described the invention, what I claim is:—

1. In an anti-wobbling device for vehicle steering wheels, an expansible spring loop constructed for frictional disposition between the vehicle spindle knuckle and the adjacent end of the vehicle axle, and means associated with said loop for engagement around the upper finger of the usual forked end of the axle for securing the loop in proper position, said means consisting of a pair of elongated pins integrally associated with the loop adapted for engagement around said finger and for detachable interconnection at their ends.

2. In an anti-wobbling device for vehicle steering wheels, a single length of spring wire bent intermediate its ends to provide a spring loop for engagement frictionally between the wheel spindle knuckle and the adjacent end of the end of the vehicle axle, said single length of spring wire being further so bent as to provide a pair of elongated pins for engagement around the upper finger of the axle knuckle to maintain the loop in frictional engagement between the knuckle and said finger.

3. In an anti-wobbling device for vehicle steering wheels, a single length of spring wire bent intermediate its ends to provide a spring loop for engagement frictionally between the wheel spindle knuckle and the adjacent end of the end of the vehicle axle, said single length of spring wire being further so bent as to provide a pair of elongated pins for engagement around the upper finger of the axle knuckle to maintain the loop in frictional engagement between the knuckle and said finger, and means at the ends of the pins whereby the same may be secured in overlapping relation.

4. In an anti-wobbling device for vehicle steering wheels, an expansible spring loop constructed for frictional disposition between the vehicle spindle knuckle and the adjacent end of the vehicle axle, said spring loop being disposed at right angles with respect to the knuckle and the adjacent end of the axle, one side portion of the spring loop being in engagement with the knuckle, the diametrically opposite side portion being in engagement with the adjacent end of the vehicle axle, and means associated with the loop for engagement around the upper finger of the usual forked end of the axle for securing the loop in proper position.

5. In an anti-wobbling device for vehicle steering wheels, an expansible spring loop constructed for frictional disposition between the vehicle spindle knuckle and the adjacent end of the vehicle axle, said spring loop being disposed at right angles with respect to the knuckle and the adjacent end of the axle, one side portion of the spring loop being in engagement with the knuckle, the diametrically opposite side portion being in engagement with the adjacent end of the vehicle axle, and means associated with the loop for engagement around the upper finger of the usual forked end of the axle for securing the loop in proper position, said means comprising a pair of elongated pins integrally associated with the loop, the free ends of said pins being detachably interlocked.

In testimony whereof I affix my signature.

CLARENCE E. STEVENS.